US009106324B1

United States Patent
Mahmoud et al.

(10) Patent No.: US 9,106,324 B1
(45) Date of Patent: Aug. 11, 2015

(54) ADAPTIVE SYMBOL TRANSITION METHOD FOR OFDM-BASED COGNITIVE RADIO SYSTEMS

(71) Applicants: Hisham A. Mahmoud, Tampa, FL (US); Huseyin Arslan, Tampa, FL (US)

(72) Inventors: Hisham A. Mahmoud, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/064,790

(22) Filed: Oct. 28, 2013

Related U.S. Application Data

(63) Continuation-in-part of application No. 12/275,721, filed on Nov. 21, 2008, now Pat. No. 8,571,136.

(60) Provisional application No. 60/989,487, filed on Nov. 21, 2007.

(51) Int. Cl.
  H04B 15/00 (2006.01)
  H04L 27/26 (2006.01)
  H04B 1/00 (2006.01)

(52) U.S. Cl.
  CPC .............. *H04B 15/00* (2013.01); *H04B 1/0003* (2013.01); *H04L 27/2601* (2013.01); *H04L 27/2607* (2013.01)

(58) Field of Classification Search
  CPC .. H04B 1/0003; H04B 15/00; H04B 27/2601; H04B 27/2607
  USPC ........... 375/285, 296; 455/63.1, 114.2, 114.3; 370/203, 206, 208
  See application file for complete search history.

(56) References Cited

U.S. PATENT DOCUMENTS 7,133,355 B1  11/2006  Gerakoulis
7,158,474 B1   1/2007  Gerakoulis
(Continued)

FOREIGN PATENT DOCUMENTS

DE   102005016717 A1  11/2006
JP      2004312674 A   11/2004
WO        0141387 A1    6/2001

OTHER PUBLICATIONS

Yamaguchi, H. "Active interference cancellation technique for MB-OFDM cognitive radio." Microwave Conference. 34th European. vol. 2. Oct. 13, 2004. pp. 1105-1108.
(Continued)

*Primary Examiner* — Jean B Corrielus
(74) *Attorney, Agent, or Firm* — Molly L. Sauter; Robert J. Varkonyi; Smith & Hopen, P.A.

(57) ABSTRACT

Modulated orthogonal frequency division multiplexing (OFDM) subcarriers generate high sidelobes, resulting in adjacent channel interference (ACI). Current sidelobe suppression techniques, such as inserting guard intervals or cancellation carrier bands, diminish the useful radio spectrum or consume significant wireless device resources. Disclosed is a method of suppressing sidelobes through adding an adaptive extension to OFDM symbols that is calculated to avoid ACI while keeping power consumption to low levels. Bandwidth and user location information are collected by a cognitive radio an utilized to determine the extension used. The method significantly reduces ACI to other bands and reduces the required guard bands, opening the radio spectrum to more efficient use.

13 Claims, 7 Drawing Sheets

(56) References Cited

U.S. PATENT DOCUMENTS

2006/0077885 A1     4/2006    Schnell et al.
2006/0133261 A1     6/2006    Cosovic et al.

OTHER PUBLICATIONS

Brandes, S.; Cosovic, I.; Schnell, M. "Reduction of out-of-band radiation in OFDM systems by insertion of cancellation carriers." Communications Letters. IEEE. vol. 10. Issue 6. Jun. 2006. pp. 420-422.

Cosovic, I.; Brandes, S.; Schnell, M. "Subcarrier weighting: a method for sidelobe suppression in OFDM systems." Communications Letters. IEEE. vol. 10. Issue 6. Jun. 2006. pp. 444-446.

Brandes, S.; Cosovic, I.; Schnell, M. "Sidelobe suppression in OFDM systems by insertion of cancellation carriers." Vehicular Technology Conference. 2005. VTC-2005-Fall. 2005 IEEE 62nd. vol. 1. Sep. 28-25. pp. 152-156.

Cabric et al., Implementation Issues in Spectrum Sensing for Cognitive Radios, Signals, Systems and Computers, 2004. Conference Record of the Thirty-Eighth Asilomar Conference on, vol. 1, Nov. 2004, pp. 772-776.

Gander, Least Squares with a Quadratic Constraint, Numer. Math. 1981, 36, pp. 291-307.

Naylor and Tahic, Apodizing functions for Fourier transform spectroscopy. J. Opt. Soc. Am. A. Nov. 2007, 24:11, pp. 3644-3648.

T. Weiss and F. K. Jondral, "Spectrum pooling: an innovative strategy for the enhancement of spectrum efficiency," IEEE Commun. Mag., Mar. 2004, vol. 42, No. 3, pp. 8-14.

T. Weiss, et al. "Mutual interference in OPDM-based spectrum pooling systems," in Proc. IEEE Veh. Technol. Conf., vol. 4, May 2004, pp. 1873-1877.

Mitola et al., Cognitive radio: making software radios snore personal, IEEE Personal Communications, Aug. 1999, vol. 6, No. 4, pp. 13-18.

ADAPTIVE SYMBOL TRANSITION METHOD FOR OFDM-BASED COGNITIVE RADIO SYSTEMS

CROSS REFERENCE TO RELATED APPLICATION

This application is a continuation-in-part of U.S. patent application Ser. No. 12/275,721, entitled "Adaptive Symbol Transition Method for OFDM-Based Cognitive Radio Systems", filed Nov. 21, 2008, U.S. Pat. No. 8,571,136 issued on Oct. 29, 2013, which claims priority to U.S. Provisional Patent Application No. 60/989,487, entitled "Adaptive Symbol Transition Method for OFDM-Based Cognitive Radio", filed Nov. 21, 2007. The contents of which are herein incorporated by reference.

FIELD OF INVENTION

This invention relates to spectrum shaping for cognitive radio applications. Specifically, the invention relates to a method for sidelobe suppression in OFDM-based systems.

BACKGROUND OF THE INVENTION

The increasing use of wireless communication systems for voice-only communications, interactive Internet data, and multi-media applications, as well as higher data rate transmission requirements have consumed much of the available wireless spectrum. Recently, opportunistic usage of Licensed frequency bands have been utilized as a solution to spectral crowding problem by using cognitive radio (CR) systems (J. Mitola and G. Q. Maguire Jr., "Cognitive radio: making software radios snore personal," *IEEE Personal Communications*, vol. 6, no. 4, pp. 13-18, August 1999; T. Weiss and F. K. Jondral, "Spectrum pooling: an innovative strategy for the enhancement of spectrum efficiency," *IEEE Commun. Mag.*, vol. 42, no. 3, pp. 8-14. March 2004). A key point for the success of CRs is the ability to shape its signal spectrum as to achieve minimum interference to licensed users (LUs) operating in the used band. However, to achieve this objective, the system physical layer (PHY) needs to be highly flexible and adaptable. Future technologies will face spectral crowding, and coexistence of wireless devices will be a major problem. Considering the limited bandwidth availability, accommodating the demand for higher capacity and data rates is a challenging task, requiring innovative technologies that can offer new ways of exploiting the available radio spectrum, such as cognitive radio. (Mitola, J. and J. Maguire, G. Q., "Cognitive radio: making software radios more personal," *IEEE Personal Commun. Mag.*, vol. 6, no. 4, pp. 13-18, August 1999).

Multi-carrier techniques, specifically orthogonal frequency division multiplexing (OFDM), are commonly used in modern wireless communications systems and have the potential of fulfilling the requirements of CR. By dividing the spectrum into subbands that are modulated with orthogonal subcarriers, OFDM spectrum can be shaped with more ease compared to other signaling techniques. OFDM utilizes sinc-type pulses to represent symbols transmitted over subcarrier signals, resulting in large sidelobes. These sidelobes may interfere with the signal transmissions of neighboring legacy systems, causing adjacent channel interference (ACI) between the transmissions.

Disabling a set of OFDM subcarriers to create a spectrum null may not be sufficient to avoid interference to LU. Sidelobe suppression is a relatively new field, with only a few sidelobe suppression techniques available. These techniques transmit large volumes of information to the receiver to obtain interference suppression. Techniques include guard bands on both sides of used OFDM spectrum coupled with windowing of the time-domain symbols (T. Weiss, J. Hillenbrand, A. Krohn, and F. K. Jondral. "Mutual interference in OPDM-based spectrum pooling systems," in *Proc. IEEE Veh. Technol. Conf*, vol. 4, May 2004, pp. 1873-1877), interference cancellation carriers (CCs) (H. Yamaguchi, 'Active interference cancellation technique for MB-OFDM cognitive radio," in *Proc. IEEE European Microwave Conf*, vol. 2, October 2004, pp. 1105-1108; S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006), or subcarrier weighting (I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006). CC techniques can significantly suppress OFDM sidelobes, as seen in FIG. 1, but result in an increase in the system peak-to-average-power ratio (PAPR) and the performance is sensitive to the cyclic prefix (CP) size. CC forces the transmitter and/or receiver to undertake significant computational analysis, increase the system complexity and introduce long delays. Moreover, due to the higher power used for the CCs, using this technique affects the spectral flatness of the transmitted signal and can increase the inter-carrier interference (ICI) effect in case of a Doppler spread or a frequency offset error at the receiver. On the other hand, subcarrier weighting method causes an increase in the system bit error rate (BER) and the interference reduction is not as significant as it is with the CC method.

Accordingly, a method for reducing signal interference while maximizing receiver resources is needed in the art.

SUMMARY OF THE INVENTION

A new method, referred to as adaptive symbol transition (AST), is shown to suppress OFDM side-lobes and shape the signal spectrum. Similar to windowing technique, the OFDM symbols are extended in time to reduce the effect of symbol transition. However, instead of using a predefined filter shape, the signal value during the extended time is optimized-based on transmitted data and detected LU bands- to reduce the interfere to LUs.

Accordingly, disclosed is a method of reducing interference in radio and wireless communications by utilizing time domain orthogonal frequency-division multiplexing symbols. The orthogonal frequency-division multiplexing symbols are then extended. Based on identified licensed user information on locations and bandwidths, a symbol extension is selected using linear least squares optimization with quadratic constraint. Exemplary licensed user information includes a user location, a licensed user bandwidth, a licensed user frequency subcarrier, or a licensed user center frequency. The characteristics of interference to the licensed user are updated for every orthogonal frequency multiplex symbol. In some instances, the sample information for at least one licensed user is upsampled. A first and second time domain symbol of an orthogonal frequency-division multiplexing symbol are obtained and the two symbols added together to obtain a transition symbol. The function described in equation (10) was then applied to the transition symbol to a minimum transition sample, which is appended to the end of the first time domain symbol of an orthogonal frequency-division multiplexing symbol. The second time domain symbol of an orthogonal frequency-division multiplexing symbol is then appended to the minimum transition sample, thereby suppressing signal sidelobes.

In some embodiments, the method also includes modulating the orthogonal frequency-division multiplexing signal, transforming the orthogonal frequency-division multiplexing signal to a time domain signal. Specific methods utilize N-point inverse fast Fourier transformation to transform the orthogonal frequency-division multiplexing signal to a time domain signal. In specific embodiments, a licensed user radio band is examined and upsampled to identify the radio signal properties. The use of the symbol extension produces an apodizing symbol. An apodizing function is a filter used to bring an a subcarrier wireless transmission spectrum smoothly down to zero at the edges of the sampled region. This suppresses sidelobes which would otherwise be produced, but at the expense of widening the lines and therefore decreasing the resolution. Non-limiting examples of apodizing functions are described in (Naylor and Tahic, Apodizing functions for Fourier transform spectroscopy. J. Opt. Soc. Am. A. November 2007, 24:11, 3644-8). Other apodizing functions include Bartlet, Bartlett-Hann, Blackman, Blackman-Harris, Blackman-Nuttall, Connes, cosine, Hamming, Lanczos, haversine, rectangular, and triangular windowing.

For example, the apodization of the Hann window, a linear combination of modulated rectangular windows, in the Fast Fourier transform analyzer is given by $$w(n) = 0.5\left(1 - \cos\frac{2\pi n}{N-1}\right), \quad (1)$$

or $$w(n) = \sin^2\left(\frac{\pi n}{N-1}\right). \quad (2)$$

Applying the Euler formula provides $$w(n) = \frac{1}{2}w_r(n) - \frac{1}{4}e^{i2\pi\frac{n}{N-1}}w_r(n) - \frac{1}{4}e^{-i2\pi\frac{n}{N-1}}w_r(n). \quad (3)$$

applying the Fourier transform, its spectrum is $$\hat{w}(\omega) = \frac{1}{2}\hat{w}_r(\omega) + \frac{1}{4}\hat{w}_r\left(\omega + \frac{2\pi}{N-1}\right) + \frac{1}{4}\hat{w}_r\left(\omega - \frac{2\pi}{N-1}\right). \quad (4)$$

with the spectrum of the rectangular window $$\hat{w}_r(\omega) = e^{-i\omega\frac{N-1}{2}}\frac{\sin\left(\frac{N\omega}{2}\right)}{\sin\left(\frac{\omega}{2}\right)}, \quad (5)$$

such that the modulation factor vanished if windows are time-shifted around 0.

In certain embodiments, the linear least squares with quadratic constraint is calculated by determining the Hermitian transpose of licensed user signal spectrum, calculating the mean-squared error for the licensed user signal spectrum using the Hermitian transpose, and optimizing the mean-squared error. In specific embodiments, the mean-squared error is optimized using a singular value decomposition. In some embodiments of the invention, an orthogonal frequency-division multiplexing output signal is generated at a steady power level.

The transition sample resulting from the method is optionally constrained using the function of equation (12) using the transition symbol and symbol extension power. Peak-to-average-power ratio is optionally reduced using the function of equation (13) using the number of samples in the transition sample, number of samples in a cyclic prefix, inverse fast fourier transfer size, and the symbol energy prior to application of the adaptive symbol transition formula. Interference is further reduced by disabling at least one subcarrier operating in the licensed user bands and to suppress the interference.

Also disclosed is a method of reducing OFDM symbol interference using window filtering of time domain symbols of an orthogonal frequency multiplex symbol. An OFDM transmission signal, which has undergone windowing, is received and processed into a first windowed value using a window function and offset as determined by a licensed user's location and bandwidth to generate a second windowed value. The time offset period is then determined and a time shift is applied to re-align the time-offset symbol period sample with the symbol sample, thereby re-aligning the second windowed value with corresponding first windowed value. The second windowed value and corresponding first windowed value are summed and converted to phases. In specific embodiments, the windowing function is apodizing.

Certain embodiments of the method include applying a first half of the windowing function to a first half of the time-offset symbol sample and applying a second half of the windowing function to a second half of the symbol sample. In specific embodiments, the summed windowed values and a first half of the symbol sample are exposed to a Fast Fourier transform to un-transform the time-domain signal to a orthogonal frequency-division multiplexing signal.

Also envisioned is a system for reducing or suppressing wireless interference. The system uses an antenna adapted to receive and transmit signals on a plurality of radio wavelengths. For example, the antenna is useful for receiving licensed user information and for transmitting on various carrier frequencies so as to not interfere with a licensed user transmission. A LU module, having an input from the antenna, is adapted to identify licensed user information, for example location and bandwidth information. A modulation module adapted to modulate an orthogonal frequency-division multiplexing signal is optionally in communication, either through electrical or software connections, to a transformation module adapted to transform the orthogonal frequency-division multiplexing signal to a time domain signal in electrical communication with the modulation module. A wireless interference suppression module, i.e. suppression module, includes a first input adapted to accept time domain orthogonal frequency-division multiplexing symbols, a second input adapted to accept a licensed user location and bandwidth information, and a logic module adapted to extend the orthogonal frequency-division multiplexing symbols. The logic module includes a module adapted to select a symbol extension using a linear least squares with quadratic constraint of the licensed user signal spectrum and a module adapted to insert the symbol extension onto the orthogonal frequency-division multiplexing symbol. The suppression module includes an output adapted to deliver the symbol extended time domain orthogonal frequency-division multiplexing symbols.

The suppression module may be integrated into a cognitive radio. In specific embodiments, the cognitive radio also includes a module adapted to modulate an orthogonal frequency-division multiplexing signal, a transformation module adapted to transform the orthogonal frequency-division multiplexing signal to a time domain signal, and a module adapted to insert at least one cyclic prefix onto the time domain signal. A N-point inverse fast Fourier transformation are integrated into the transformation module circuitry.

Some embodiments of the suppression module also include a cognitive radio engine adapted to examine a radio band for a licensed user. A serial to parallel (S/P) converter is optionally in electrical communication with the modulation module and converts a serial bitstream of encoded data into several parallel bitstreams. A correlating parallel to serial (P/S) converter is optionally in electrical communication with the output of the modulation module, to convert several parallel bitstreams into a serial bitstream of encoded data. An equalizer may be included in the system, such as by placing the equalizer in electrical communication with the transformation module. In addition, at least one digital radio frequency filter is optionally in electrical communication with the antenna. The cognitive radio engine is adapted to upsample a radio signal from the licensed user for identification of the radio signal properties is provided in specific embodiments.

This allows wireless users to exploit available spectrum opportunities and achieve highest possible spectral efficiency while keeping the interference to detected LUs to a minimum.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The disclosed method assumes use of a cognitive radio (CR) system employing OFDM signaling. The CR is assumed to be aware of the surrounding environment and the radio channel characteristics. After scanning the channel, the CR is able to identify LUs operating within the same band (D. Cabric, S. Mishna. and R. Brodersen, "Implementation issues in spectrum sensing for cognitive radios," in *Signals, Systems and Computers*, 2004. *Conference Record of the Thirty-Eighth Asilomar Conference on*, vol. 1, November 2004, pp. 772-776). The disclosed method is useful for other radio systems or devices employing OFDM signaling. As such, the methods disclosed herein are not limited to specific devices, but applies to any device that utilizes OFDM signaling.

Figure 1:
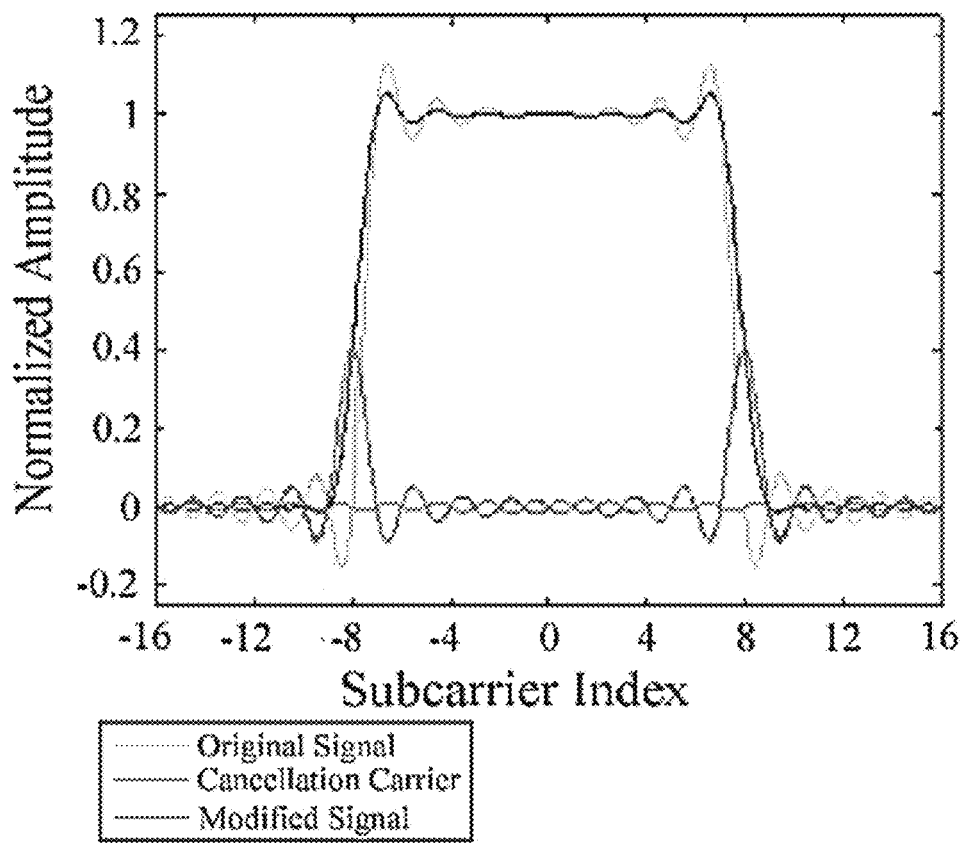
FIG. 1 is a graph of subcarrier amplitudes of OFDM signals before and after modification with cancellation carrier signals.
Figure 2:
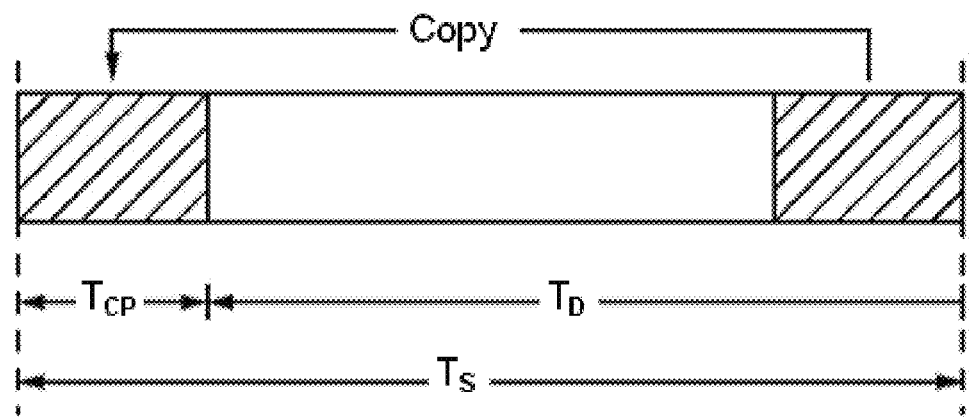
FIG. 2 is an illustration of the cylic prefix extension for OFDM systems.

OFDM signals can be considered as a composition of large number of independent random signals using conventional modulation schemes at a low symbol rates. Since the duration of each symbol is long, guard intervals are commonly inserted between the OFDM symbols. The cyclic prefix, which is transmitted during the guard interval, consists of the end of the OFDM symbol copied into the guard interval, and the guard interval is transmitted followed by the OFDM symbol, as seen in FIG. 2. Useful data duration and CP length are represented by $T_D$ and $T_{CP}$ respectively and they make up the total duration of OFDM symbol $T_S$, i.e. $T_S=T_D+T_{CP}$, as shown in FIG. 2.

Figure 3:
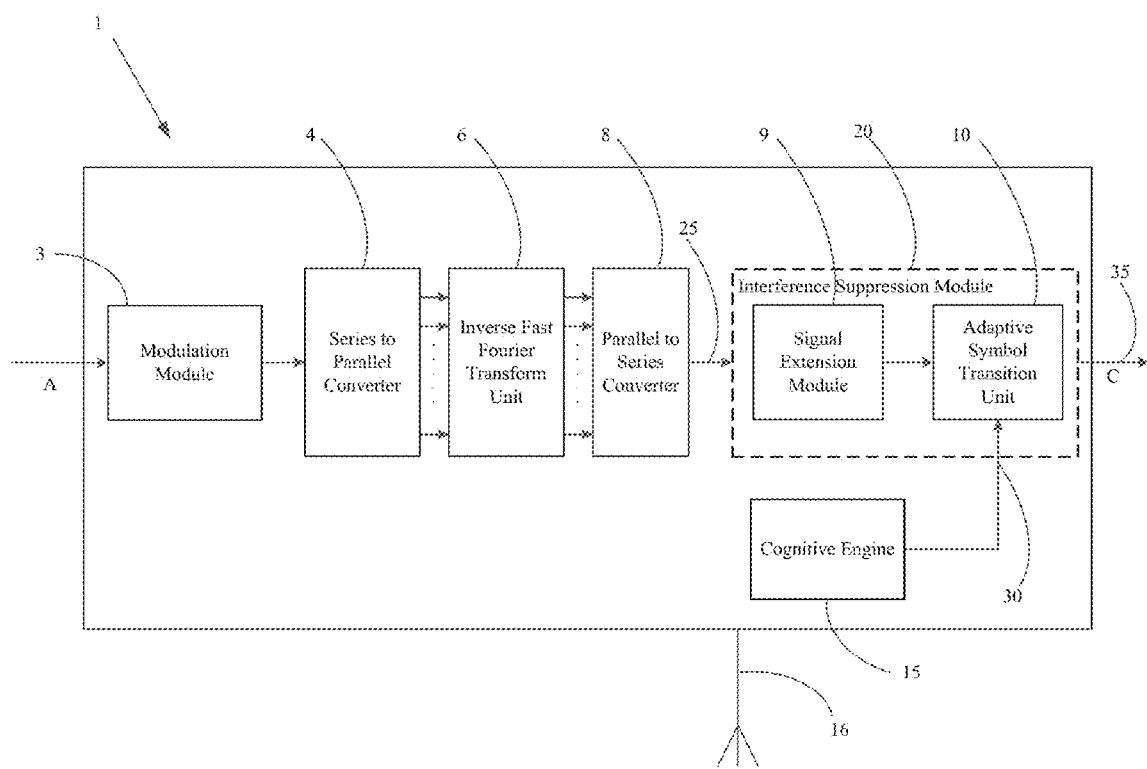
FIG. 3 is an illustrative diagram of a cognitive radio transmitter.

The system model of cognitive radio 1 is shown in FIG. 3. Encoded data A is transferred from the cognitive radio user and the encoded data is fed into modulation module 3, which modulates the data, which is then fed to series to parallel (S/P) converter 4 and fed to transformation module 6, which is an inverse fast Fourier transform (IFFT) unit, thereby generating time domain orthogonal frequency-division multiplexing signals. The time domain orthogonal frequency-division multiplexing signals are fed to parallel to series (P/S) converter 8 and transferred to an interference suppression module 20. The interference suppression module 20 includes a first input 25 adapted to accept the time domain orthogonal frequency-division multiplexing symbols from the transformation module 6 and a second input 30 that accepts the licensed user location and bandwidth information from the cognitive engine 15. The interference suppression module 20 further includes a signal extension module 9, which provides a CP (cyclic prefix) consisting of G samples. Signal extension module 9 is optionally a logic module which includes a module adapted to select a symbol extension using a linear least squares with quadratic constraint. The extended symbols ($Y^{(m)}$) are fed to an adaptive symbol transition (AST) unit 10 of the interference suppression module 20. Cognitive engine 15 collects interference data on licensed users from multiple- or cooperative-antenna array 16, and transfers the licensed user (LU) operating information in the same band to the AST unit 10. AST unit 10 generates a minimum transition sample based on the extended symbols and LU information. The minimum transition sample is then appended to the time domain symbols to form extended signal C that is provided as an output 35 of the interference suppression module 20.

As previously described with reference to FIG. 3, the encoded data is modulated and fed to an N-point inverse fast Fourier transform (IFFT) unit 6. $F_{N1 \times N2} = \{F_{n_1, n_2}\}$ is defined as the $N_1$-point Fourier transform matrix of a vector of length $N_2$, where $$F_{n_1, n_2} = \exp\left(\frac{-j2\pi n_1 n_2}{N_1}\right). \tag{6}$$

The time domain signal at the output of the IFFT is then defined as $$x^{(m)} = \frac{1}{N} F^*_{N \times N} X^{(m)}, \quad (7)$$

where (m) is the symbol index, N is the IFFT size, (.)* is the complex conjugate operator, 1/N F* is the inverse Fourier transform matrix, and $X^{(m)}=[X_1^{(m)}, X_2^{(m)}, \ldots, X_N^{(m)}]^T$ is the modulated data vector. The signal is then extended with a CP consisting of G samples. The extended symbols ($Y^{(m)}$) are fed to the AST unit, where the extension from the AST unit is added to extended symbol $Y^{(m)}$. Meanwhile, the cognitive engine passes required information regarding LUs operating in the same band to the AST unit. This information is used to suppress the interference-caused by OFDM sidelobes- to LUs as explained below.

Fixed windowing of OFDM symbols has been investigated as a method to suppress OFDM sidelobes (T. Weiss, et al. "Mutual interference in OPDM-based spectrum pooling systems," in *Proc. IEEE Veh. Technol. Conf*, vol. 4, May 2004, pp. 1873-1877). The time domain symbols passed through a filter (usually raised cosine (RC) filters are used), and consecutive symbols are allowed to overlap. The process smoothes the transition between OFDM symbols and thus improves the spectral characteristics of the OFDM signal. To keep the orthogonality between OFDM subcarriers, the symbols are cyclically extended to cover the overlapping region. The advantage of this approach is its low computational complexity. The disadvantage is the reduced spectral efficiency due to the symbol extension.

Figure 4:
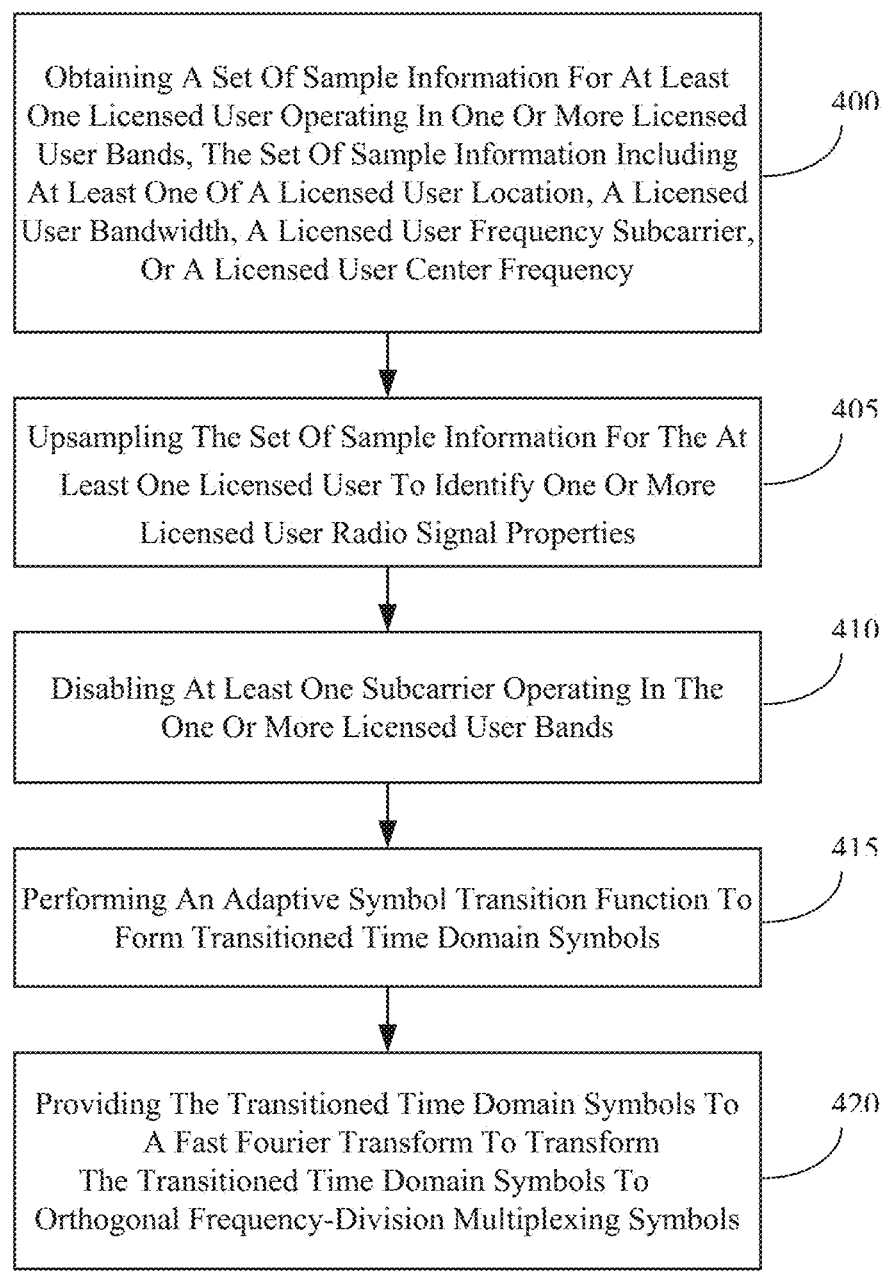
FIG. 4 is a flow diagram showing the method used in an OFDM-based cognitive radio system, in accordance with an embodiment of the present invention.

With reference to FIG. 4, a method of reducing orthogonal frequency-division multiplexing symbol interference in accordance with the present invention includes obtaining a set of sample information for at least one licensed user operating in one or more licensed user bands, the set of sample information including at least one of a licensed user location, a licensed user bandwidth, a licensed user frequency subcarrier, or a licensed user center frequency 400 and performing an adaptive symbol transition function 415. The method may further include providing the transitioned time domain symbols to a fast fourier transform to transform the transitioned time domain symbols to orthogonal frequency-division multiplexing symbols 420. In a particular embodiment, the method may further include upsampling the set of sample information for the at least one licensed user to identify one or more licensed user radio signal properties 405 and disabling at least one subcarrier operating in the one or more licensed user bands 410 prior to performing an adaptive symbol transition function to form transition time domain symbols 415.

Figure 5:
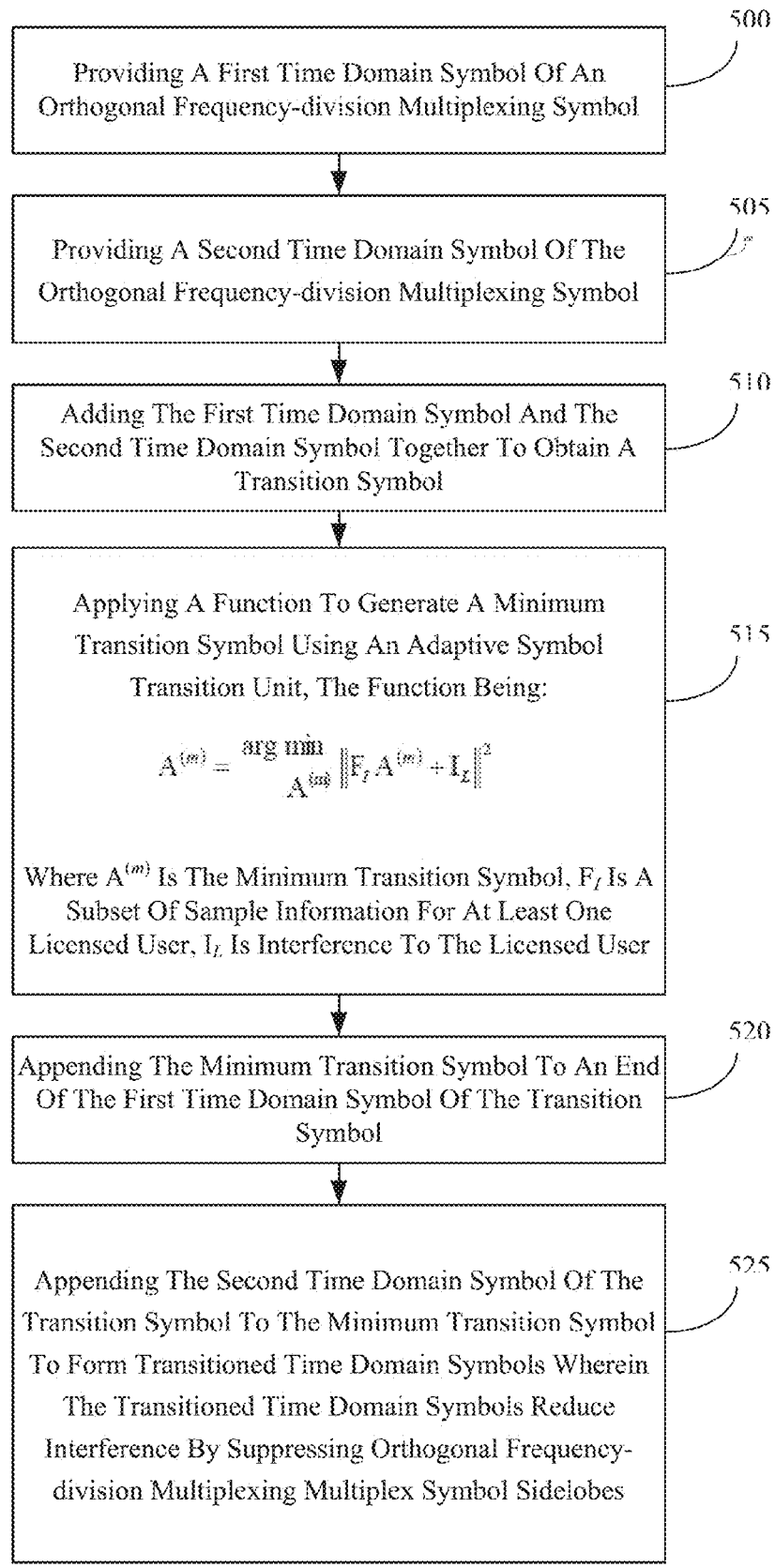
FIG. 5 is a flow diagram showing the method of performing an adaptive symbol transition function used in an OFDM-based cognitive radio system, in accordance with an embodiment of the present invention.

With reference to FIG. 5, the method step of performing an adaptive symbol transition function 415 described with reference to FIG. 4, may further include, providing a first time domain symbol of an orthogonal frequency-division multiplexing symbol 500 and providing a second time domain symbol of the orthogonal frequency-division multiplexing symbol 505. Performing an adaptive symbol transition function 415 may further include adding the first time domain symbol and the second time domain symbol together to obtain a transition symbol 510. The transition symbol may then be used for applying a function to generate a minimum transition symbol using an adaptive symbol transition unit 515. The minimum transition symbol may then be appended to an end of the first time domain symbol of the transition symbol 520 and to the second time domain symbol of the transition symbol to form transitioned time domain symbols wherein the transitioned time domain symbols reduce interference by suppressing orthogonal frequency-division multiplexing symbol sidelobes 525.

Example 1

Similar to windowing, the AST technique suppresses OFDM sidelobes by extending OFDM symbols and using the extensions to smooth the transition between consecutive symbols. However, instead of using a predefined window shape (e.g., RC), an adaptive method was used that calculates the value of the symbol extension based on LUs location and bandwidth.

Assume the CR system detects a LU signal spanning over K subcarriers ($X_{i+1}, X_{i+1}, \ldots X_{i+K}$), where $i\Delta f$ is the licensed signal offset with respect to the OFDM signal, $K\Delta f$ is the licensed signal bandwidth, and $\Delta f$ is the frequency subcarrier spacing. The above subcarrier set is disabled to avoid interfering with the LU. To further suppress the interference, the AST unit adds an extension ($A^{(m)}=[A_1^{(m)}, A_2^{(m)}, \ldots A_C^{(m)}]^T$) to every OFDM symbol ($Y^{(m)}$) as shown in FIG. 5, where C is the number of samples in $A^{(m)}$. $Y^{(m)}$ and $Y^{(m-1)}$ are used to calculate $A^{(m)}$ in the following manner.

First, the interference to the LU is examined. The signal is upsampled by a factor v, or in other words, v points per subcarrier. The signal spectrum of two consecutive symbols is, $$S^{(m)} = F^*_{vN \times D} \begin{bmatrix} Y^{(m-1)} \\ A^{(m)} \\ Y^{(m)} \end{bmatrix}, \quad (8)$$

$$\underbrace{\phantom{XXXX}}_{Z^{(m)}}$$

where D=2N+2G+C. The interference to the LU (I) is then, $$I_L = F_K Z_K^{(m)}, \quad (9)$$

where $F_K$ is a subset of $F_{vN \times D}$ containing only the rows that corresponds to the LU band (rows v(i+1) to v(i+K)) and is the same as $Z_K^{(m)}$ but with $A^{(m)}=[0]_{c \times 1}$. To minimize interference power, the AST unit chooses $A^{(m)}$ such that, $$A^{(m)} = \underset{A^{(m)}}{\arg\min} \|F_I A^{(m)} + I_L\|^2, \quad (10)$$

where $F_I$ is a subset of $F_K$ containing only the columns that corresponds to $A^{(m)}$ columns N+G to N+C+G−1.

The mean-squared-error (MSE) solution to (10) is, $$A_{min}^{(m)} = -(F_I^H F_I)^{-1} F_I^H I_L, \quad (11)$$

where $(.)^H$ is the Hermitian transpose. However, (11) can result in very high values. This leads to increase in the signal PAPR. In addition, the useful symbol energy is reduced compared to the total symbol energy resulting in an increase in the system BER. To mitigate this effect, a constraint was added on the minimization in (10) such that the symbol extension power is below a given level ($\alpha^2$), $$\|A^{(m)}\|^2 \le \alpha^2. \quad (12)$$

The optimization in (10) and (12) is known as linear least squares problem with a quadratic constraint which can be solved using generalized singular value decomposition (W. Gander, "Least squares with a quadratic constraint," *Numerische Mathematik*, vol. 36, no. 3, pp. 291-307, 1980). Fortunately, for a given spectrum shape, $F_I$ is fixed and thus, only $I_L$ needs to be updated for every OFDM symbol. The computational complexity of the optimization problem is reduced significantly due to this fact.

Figure 6:
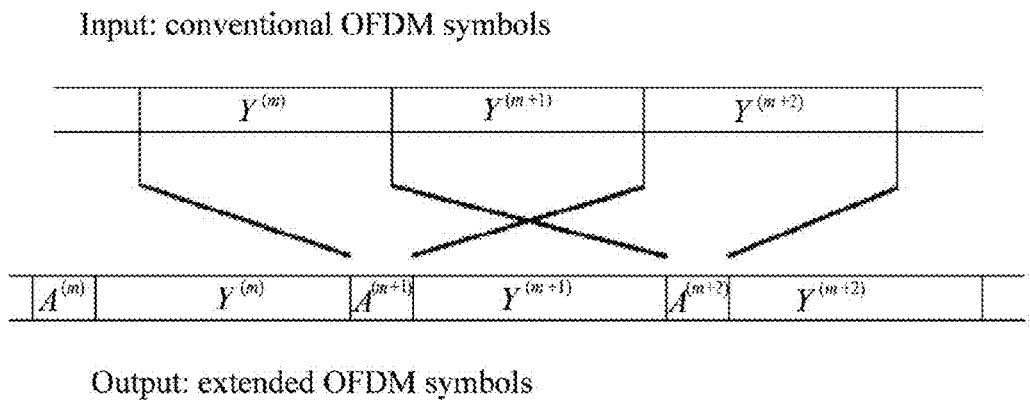
FIG. 6 is a diagram of the adaptive symbol transition output depicting the block extensions added to the orthogonal frequency division multiplexing symbol in accordance with an embodiment of the present invention.

An important parameter for OFDM systems is the PAPR. By choosing $\alpha^2$ such that, $$\alpha^2 = \frac{C}{N+G} E_S, \quad (13)$$

the signal average power is kept at the same level, where $E_S$ is the symbol energy prior to the AST unit. Since the AST signal is optimized to smooth the symbol transition, as seen in FIG. 6, it does not introduce any peaks to the signal and, thus, the PAPR of the system does not increase. On the other hand, the AST reduces the useful symbol energy. Using (13), the worst case signal-to-noise ratio (SNR) loss ($\gamma$) is, $$\gamma = 10 \cdot \log_{10}\left(\frac{E_S + \alpha^2}{E_S}\right) dB. \quad (14)$$

By controlling C and for a fixed PAPR, where (14) is used, the system has a tradeoff between reducing $\gamma$ (reducing C), or improving the interference suppression (increasing C).

It is noteworthy that since AST technique is performed on time-domain symbols, the performance is not sensitive to the CP size. In addition, the AST does not introduce any inter-symbol interference (ISI) to the system as the leakage from the symbol extension is contained in the CP. The intended receiver can remove the AST extension along with the CP to maintain an ISI-free signal.

Example 2

The AST technique suppresses OFDM sidelobes by extending OFDM symbols and using the extensions to smooth the transition between consecutive symbols in a manner similar to windowing, but using an adaptive symbol extension based on LUs location and bandwidth. The adaptive method that calculates the value of the symbol extension based on LU center frequency and bandwidth signal. In this example, a first symbol is obtained and a prefix and suffix for the first symbol determined based on a licensed user's information, namely locations and bandwidths. The determined prefix and suffix are appended onto the first symbol. For example, the first symbol is extended with a CP consisting of G samples and the extended symbols y(m) are fed to the AST unit. A second symbol is obtained and a prefix and suffix for the first symbol determined based on a licensed user's information, namely locations and bandwidths, in some situations, the licensed user's information obtained during the first symbol stage is used for the second symbol, however the prefix and suffix information will differ. The determined prefix and suffix are appended onto the second symbol. The suffix of the first symbol is overlapped with the prefix of the second symbol, such that the overlap occurs in time, and the overlapped prefix and suffix are windowed, such as by applying a raised cosine window. However, other windowing techniques are within the scope of this disclosure, and would be within the skill of an artisan to utilize in place of the raised cosine window. The windowing generates a smooth transition from the first symbol to the second symbol. A linear least squares problem with a quadratic inequality constraint is used to mitigate the effect of reduced useful symbol energy.

The cognitive engine may also transmit information regarding LU operating in the same band to both the subcarrier mapper and the AST unit, which is to disable subcarriers operating in the LU bands and to suppress the interference.

Assume the CR system detects an LU signal spanning over K subcarriers (Xi+1, Xi+2, . . . Xi+K), where $i\Delta f$ is the licensed signal offset with respect to the OFDM signal, $K\Delta f$ is the licensed signal bandwidth, and $\Delta f$ is the frequency subcarrier spacing. The above subcarrier set is disabled to avoid interfering with the LU. To further suppress the interference, the AST unit adds an extension $$a^{(m)} = [a_1^{(m)}, a_2^{(m)}, \ldots a_C^{(m)}]^T, \quad (15)$$

to every OFDM symbol $y^{(m)}$ as shown in FIG. 2, where C is the number of samples in $a^{(m)}$. $y^{(m)}$ and $y^{(m-1)}$ are used to calculate $a^{(m)}$ in the following manner.

First, the characteristics of interference to the LU was examined. The signal is upsampled by a factor $\zeta$, or in other words, $\zeta$ points per subcarrier were consider. The signal spectrum of two consecutive symbols can be obtained as, $$S^{(m)} = F_{\zeta N, \beta} \underbrace{\begin{bmatrix} y^{(m-1)} \\ a^{(m)} \\ y^{(m)} \end{bmatrix}}_{z^{(m)}}, \quad (16)$$

where $\beta = 2N+2G+C$. The characteristics of interference to the LU is then, $$I_L = F_K z_K^{(m)}, \quad (17)$$

where $F_K$ is a subset of $F_{\zeta N, \beta}$ containing only the rows that corresponds to the LU band (rows $\zeta(i+1)$ to $\zeta(i+K)$) and $z^{(m)}$ is the same as $z^{(m)}$ but with $a^{(m)} = [0]_{C \times 1}$. To minimize interference power, the AST unit chooses $a^{(m)}$ such that, $$a^{(m)} = \underset{A^{(m)}}{\arg \min} \|F_I A^{(m)} + I_L\|^2, \quad (18)$$

where $F_I$ is a subset of $F_K$ containing only the columns that corresponds to $a^{(m)}$; columns N+G to N+G+C−1.

The mean-squared-error (MSE) solution to (18) can result in very high values for $a^{(m)}$. This leads to increase in the extension power. As a result, the useful symbol energy is reduced compared to the total symbol energy resulting in an increase in the system BER. To mitigate this effect, a constraint on the minimization in (18) was added such that the symbol extension power is below a given level $\alpha^2$, $$\|A^{(m)}\|^2 \le \alpha^2. \tag{19}$$

The optimization in (18) and (19) is known as linear least squares problem with a quadratic inequality constraint (Gander, Least squares with a quadratic constraint, *Numerische Mathematik*, vol. 36, no. 3, pp. 291-307, 1980). Using singular value decomposition (SVD), provided the following, $$U^H F_I V = \begin{bmatrix} D_{FI} \\ 0 \end{bmatrix}, \tag{20}$$

and $$D_{FI} = \text{diag}(v_1, \ldots v_c), v_i \ge 0, \tag{21}$$

where $(.)^H$ is the Hermitian transpose, $[U]_{\gamma \times \gamma}$ and $[V]_{C \times C}$ are unitary, and $\gamma = \zeta(K-1)+1$. Using the method of Lagrange multipliers provides the following equation, $$f(\lambda) = \sum_{i=1}^{C} \frac{-v_i^2 |\tilde{I}_{\cdot L,i}|^2}{(v_i^2 + \lambda)^2} = \alpha^2, \tag{22}$$

where $\tilde{I}_L = U^H I_L = [\tilde{I}_{L,1}, \ldots, \tilde{I}_L, \gamma]^T$. If a solution exist to the optimization problem, the function $\theta(\lambda)$ will have a unique positive root and it has been shown that this is the desired root (Gander, Least squares with a quadratic constraint, *Numerische Mathematik*, vol. 36, no. 3, pp. 291-307, 1980). The solution can then be obtained as, $$a^{(m)} = V[-v_1 \tilde{I}_{\cdot L,1}/(v_1^2 + \tilde{\lambda}), \ldots, -v_1 \tilde{I}_{\cdot L,C}/(v_C^2 + \tilde{\lambda})]^T \tag{23}$$

where $\lambda$ is the unique positive root of (22). Fortunately, for a given spectrum shape, $F_I$ is fixed and thus, only $\tilde{I}_L$ needs to be updated for every OFDM symbol. The computational complexity of the optimization problem is reduced significantly due to this fact.

An important parameter for OFDM systems is the PAPR which affects the dynamic range over which the system should be linear. By choosing $\alpha^2$ such that, $$\alpha^2 = \frac{C}{N+G} E_S, \tag{24}$$

the signal average power is kept at the same level, where ES is the symbol energy prior to the AST unit. Since the AST signal is optimized to smooth the symbol transition, it does not introduce any peaks to the signal (confirmed by simulation results) and, thus, the PAPR of the system does not increase. Nevertheless, the AST reduces the useful symbol energy. Using (24), the maximum signal-to-noise ratio (SNR) loss $\gamma$ is, $$\gamma = 10 \cdot \log_{10}\left(\frac{E_S + \alpha^2}{E_S}\right) = 10 \cdot \log_{10}\left(1 + \frac{C}{N+G}\right) \text{dB}. \tag{25}$$

By controlling C and for a fixed PAPR, the system has a tradeoff between reducing $\gamma$ (reducing C), or improving the interference suppression (increasing C).

Example 3

Figure 7:
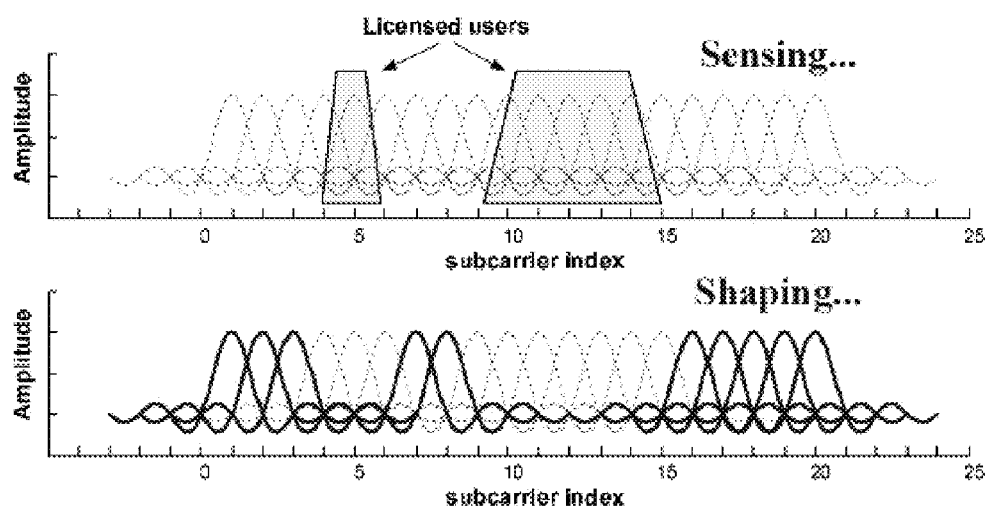
FIG. 7 is a graph showing the spectrum sensing and shaping using OFDM in accordance with an embodiment of the present invention.

The performance of the proposed method was investigated with computer simulations using an OFDM-based CR system with N=256, G=16. The AST method was used with C=16, v=16, and $\alpha^2$=0.06 $E_g$ and the DC subcarrier was disabled. Data subcarriers were modulated with a QPSK signal. All results shown were averaged over 10,000 OFDM symbols. Two cases were considered for performance evaluation. In the first case, a LU was detected spanning 24 OFDM subcarriers. The system disabled 32 subcarriers leaving a guard band of 4 subcarriers on each side of the LU band. The guard bands were to allow the signal power to decay while the AST unit performs the optimization over the 24-subcarrier band. The normalized power spectral density (PSD) of the signal at the output of the AST unit was measured, shown in FIG. 7. The system performance was compared with a conventional OFDM system without any symbol extension; and with an OFDM system using RC windowing, and a symbol duration equal to the AST system. The conventional OFDM system suffers an interference level of −22 dB. The RC-windowed system suppressed the interference to −33 dB, while the AST reduced the interference further to less than −50 dB. The AST method achieved a 28 dB gain over conventional systems while keeping the SNR loss, $\gamma \le 0.25$ dB. Compared to the results presented in (S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006; I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006), the AST shows a superior performance in both interference suppression and SNR loss.

Figure 8:
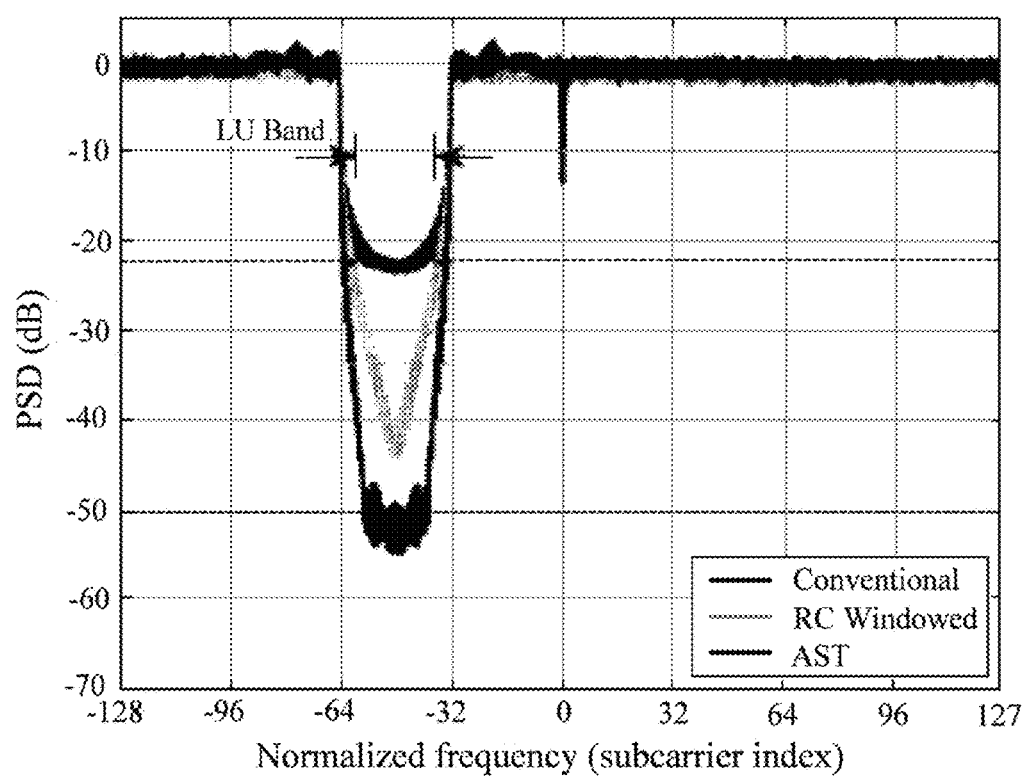
FIG. 8 is a graph of the power spectral density for an orthogonal frequency division multiplexing signal with adaptive symbol transition block with 32 subcarrier gaps.
Figure 9:
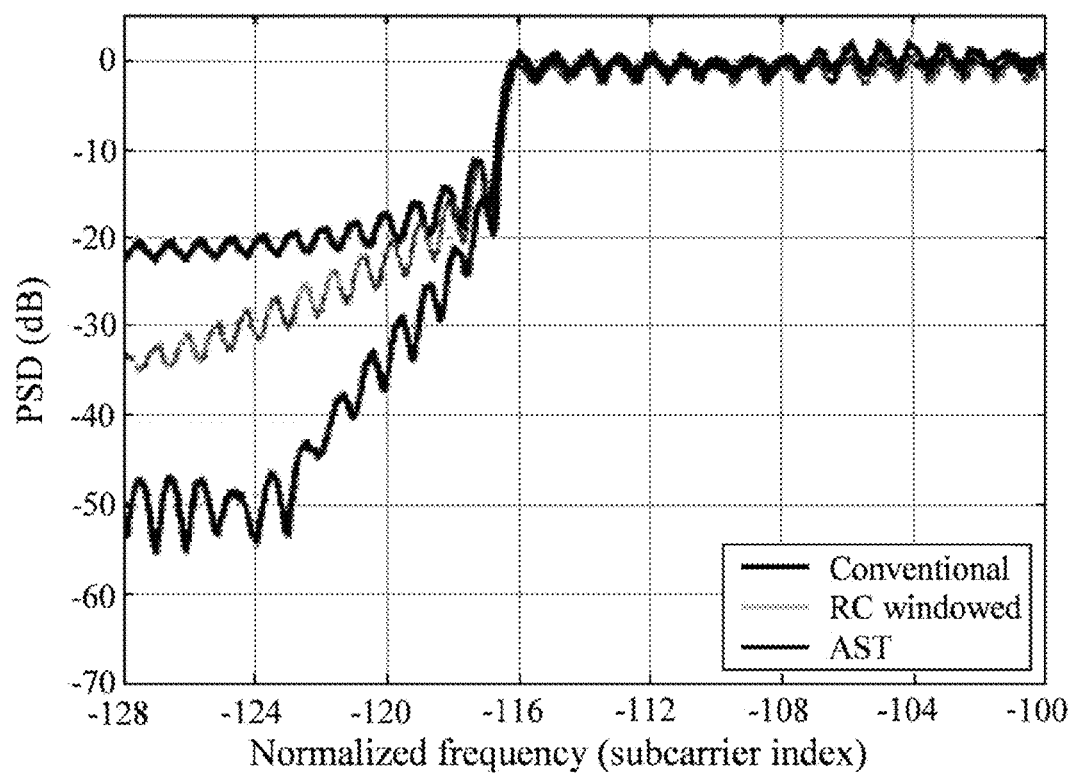
FIG. 9 is a graph of the power spectral density for an orthogonal frequency division multiplexing signal with adaptive symbol transition block with 16 subcarrier guard bands.

Finally, in the second case an AST method was used to reduce the number of disabled subcarriers used as guard bands in current OFDM systems. For example, a WiMAX system employing a 256 subcarriers OFDM system disables 55 subcarriers (28 and 27 on the left and right sides, respectively) to limit out-of-band radiations. Using sidelobe suppression techniques, the required guard band was reduced for an increase in system complexity. 24 subcarriers (12 on each side) as guard bands. N, C, C, u, and $\alpha^2$ were the same as the first case. The normalized PSD of the left side of the signal is shown in FIG. 8. The AST method suppresses the signal power to −50 dB by the end of the in-band signal compared to −32 dB for RC-window method and −20 dB for conventional systems.

A new method to suppress OFDM sidelobes and shape the spectrum of OFDM signals is presented. The proposed AST technique extends the OFDM symbols and uses that extension to reduce ACI to other users operating in the same band. Simulation results show that AST can achieve a significant gain over conventional sidelobe suppression techniques. Moreover, AST does not increase the signal PAPR and keeps a low SNR loss.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of the present invention, it will be apparent to those skilled in the art that variations and modifications are possible without deviating from the broad spirit and principle of the invention. It is also to be understood that the following claims are intended to cover all of the generic and specific features of the invention herein described, and all statements of the scope of the invention which, as a matter of language, might be said to fall therebetween.

What is claimed is:

1. A method of reducing orthogonal frequency-division multiplexing symbol interference, the method comprising:
    obtaining a set of sample information for at least one licensed user operating in one or more licensed user bands, the set of sample information including at least one of a licensed user location, a licensed user bandwidth, a licensed user frequency subcarrier, or a licensed user center frequency;
    performing an adaptive symbol transition function, including:
        providing a first time domain symbol of an orthogonal frequency-division multiplexing symbol;
        providing a second time domain symbol of the orthogonal frequency division multiplexing symbol;
        adding the first time domain symbol and the second time domain symbol together to obtain a transition symbol;
        applying a function to generate a minimum transition symbol using an adaptive symbol transition unit, the function being:

$$A^{(m)} = \underset{A^{(m)}}{\arg\min} \|F_I A^{(m)} + I_L\|^2$$

where $A^{(m)}$ is the minimum transition symbol, $F_I$ is a subset of sample information for at least one licensed user, $I_L$ is interference to the licensed user;
        appending the minimum transition symbol to an end of the first time domain symbol of the transition symbol; and
        appending the second time domain symbol of the transition symbol to the minimum transition symbol to form transitioned time domain symbols;
    wherein the transitioned time domain symbols reduce interference by suppressing orthogonal frequency-division multiplexing sidelobes.

2. The method of claim 1, wherein the transition symbol is constrained by $$\|A^{(m)}\|^2 \leq \alpha^2$$

where $A^{(m)}$ is the transition symbol and $\alpha^2$ is a symbol extension power.

3. The method of claim 2, further comprising:
    reducing peak-to-average-power ratio by applying the formula:

$$\alpha^2 = \frac{C}{N+G} E_S$$

wherein C is the number of samples in the transition symbol, G is the number of samples in a cyclic prefix, N is the inverse fast fourier transform size, and $E_S$ is the symbol energy prior to performing the adaptive symbol transition function.

4. The method of claim 1, further comprising, providing the transitioned time domain symbols to a fast fourier transform to transform the transitioned time domain symbols to orthogonal frequency-division multiplexing symbols.

5. The method of claim 1, further comprising updating characteristics of the interference to the licensed user for every orthogonal frequency-division multiplexing symbol.

6. The method of claim 1, further comprising upsampling the set of sample information for the at least one licensed user to identify one or more licensed user radio signal properties.

7. The method of claim 1, further comprising disabling at least one subcarrier operating in the one or more licensed user bands prior to performing the adaptive symbol transition function.

8. A method of reducing orthogonal frequency-division multiplexing symbol interference, the method comprising:
    obtaining a set of sample information for at least one licensed user, operating in one or more licensed user bands, the set of sample information including at least one of a licensed user location, a licensed user bandwidth, a licensed user frequency subcarrier, or a licensed user center frequency;
    disabling one or more subcarriers operating in the one or more licensed user bands;
    performing an adaptive symbol transition function, comprising:
        providing a first time domain symbol of an orthogonal frequency-division multiplexing symbol;
        providing a second time domain symbol of the orthogonal frequency division multiplexing symbol;
        adding the first time domain symbol and the second time domain symbol together to obtain a transition symbol;
        applying a function to generate a minimum transition symbol using an adaptive symbol transition unit, the function being:

$$A^{(m)} = \underset{A^{(m)}}{\arg\min} \|F_I A^{(m)} + I_L\|^2$$

where $A^{(m)}$ is the minimum transition symbol, $F_I$ is a subset of sample information for at least one licensed user, $I_L$ is interference to the licensed user;
        appending the minimum transition symbol to the end of the first time domain symbol of the transition symbol; and
        appending the second time domain symbol of the transition symbol to the minimum transition symbol to form transitioned time domain symbols;
    wherein the transitioned time domain symbols reduce interference by suppressing orthogonal frequency-division multiplexing sidelobes.

9. The method of claim 8, wherein the transition symbol is constrained by $$\|A^{(m)}\|^2 \le \alpha^2$$

where $A^{(m)}$ is the transition symbol and $\alpha^2$ is the symbol extension power.

10. The method of claim 9, further comprising:
reducing peak-to-average-power ratio by applying the formula:

$$\alpha^2 = \frac{C}{N+G} E_S$$

wherein C is the number of samples in the transition symbol, G is the number of samples in a cyclic prefix, N is the inverse fast fourier transform size, and $E_S$ is the symbol energy prior to application of the adaptive symbol transition formula.

11. The method of claim 8, further comprising, providing the transitioned time domain symbols to a fast fourier transform to transform the transitioned time domain symbols to orthogonal frequency-division multiplexing symbols.

12. The method of claim 8, further comprising upsampling the set of sample information for at least one licensed user to identify licensed user radio signal properties.

13. The method of claim 8, further comprising updating characteristics of the interference to the licensed user for every orthogonal frequency-division multiplexing symbol.

* * * * *